United States Patent [19]

Quakenbush

[11] 4,054,956
[45] Oct. 25, 1977

[54] FOLDABLE BUNK BED ASSEMBLY

[76] Inventor: Howard M. Quakenbush, 308 Maple St., Apple River, Ill. 61001

[21] Appl. No.: 602,205

[22] Filed: Aug. 6, 1975

[51] Int. Cl.² .............................................. A47C 17/40
[52] U.S. Cl. ........................................ 5/9 R; 5/37 C
[58] Field of Search ................ 5/8, 9, 10, 37 R, 37 C; 297/75, 77, 84

[56] References Cited
U.S. PATENT DOCUMENTS

| | | | |
|---|---|---|---|
| 2,535,448 | 12/1950 | Nowell | 5/37 R |
| 2,774,412 | 12/1956 | Luckhardt | 297/75 |
| 3,863,280 | 2/1975 | Mizelle | 5/37 C |

Primary Examiner—Casmir A. Nunberg

[57] ABSTRACT

The invention relates to a folding bunk bed assembly in which a pair of hingedly connected cushion sections are supported on arms to swing about a horizontal axis close to a wall from an upperbed condition in which they are in side-by-side horizontal relation and a lower condition in which one is folded behind the other and against the wall, the outer section then forming a back rest for a person sitting on a seat-bed, the seat-bed serving as a lower bunk when the cushion sections are in the upper bed condition to serve as an upper bunk.

9 Claims, 5 Drawing Figures

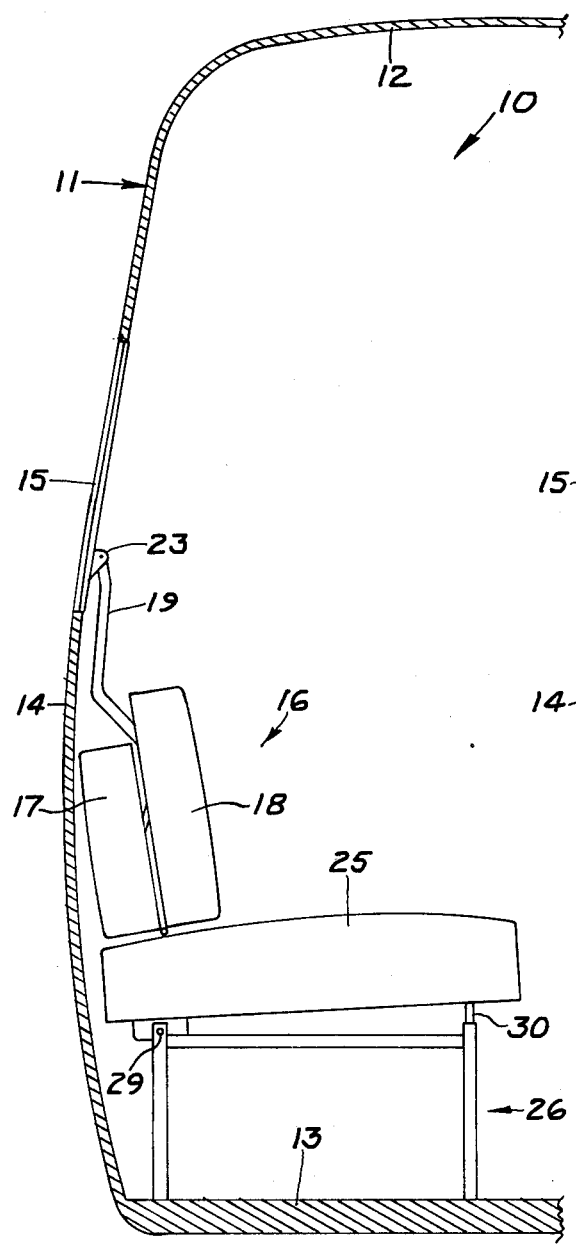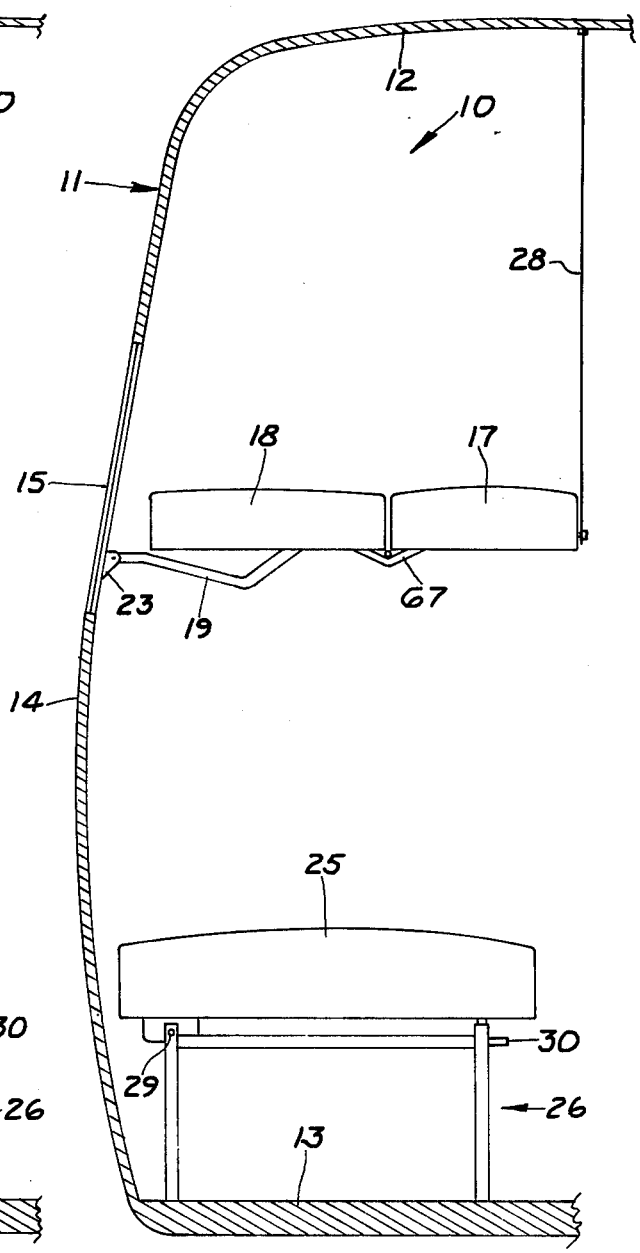

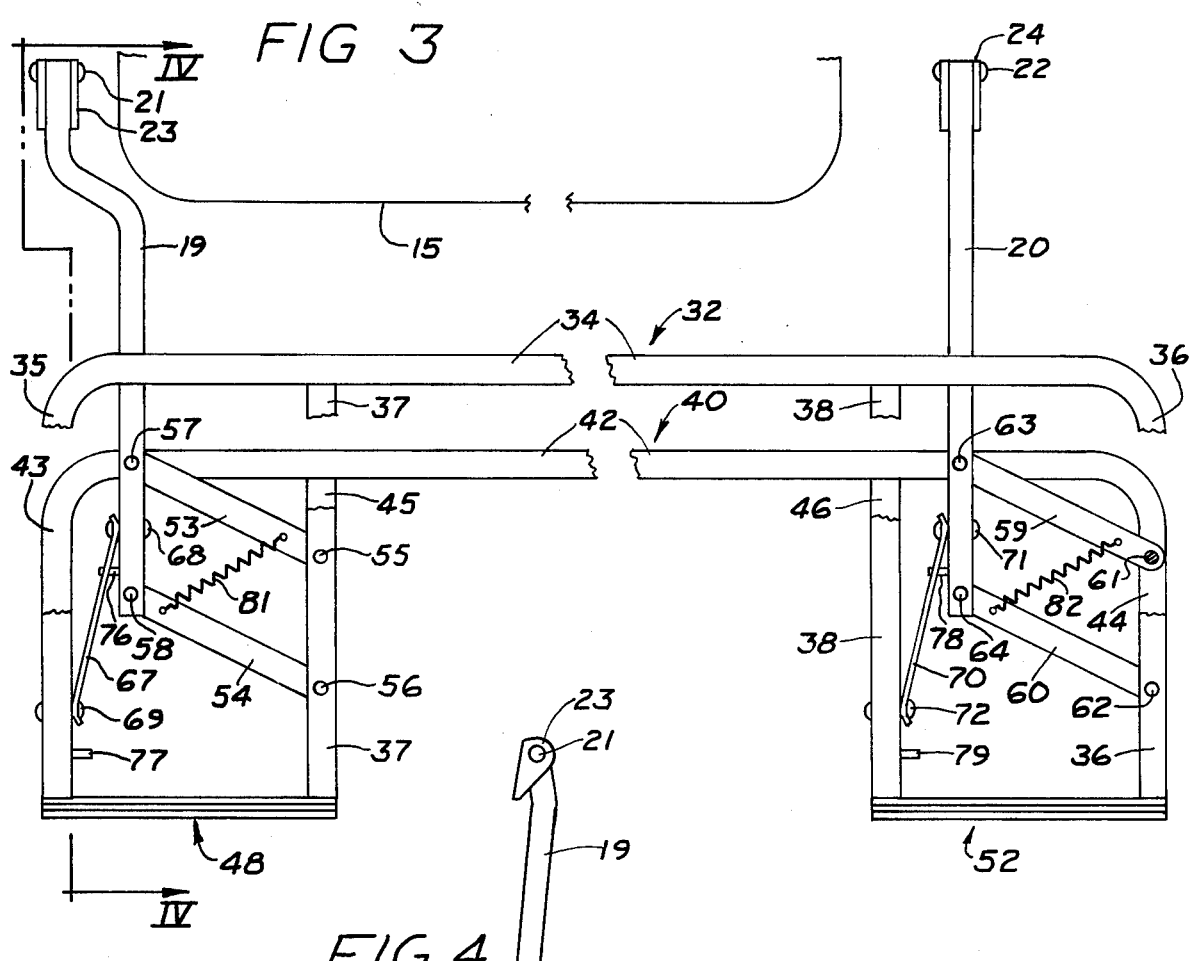
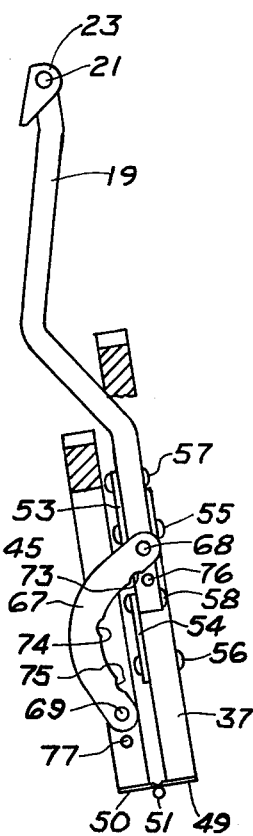
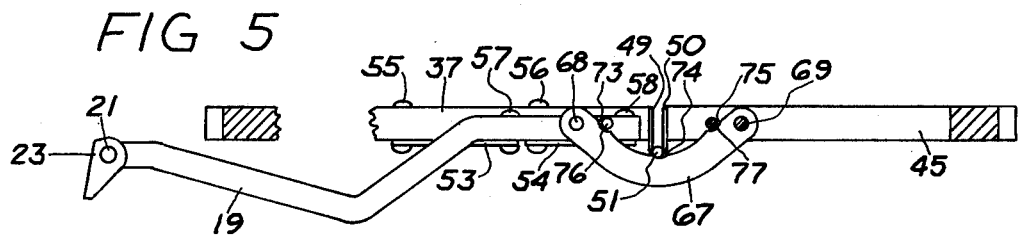

FOLDABLE BUNK BED ASSEMBLY

This invention relates to a folding bunk assembly and more particularly to a folding bunk assembly which permits highly efficient use of space being especially advantageous in campers or the like. The assembly is comparatively simple in construction and operation and easy to operate while being rugged, durable and economically manufacturable.

BACKGROUND OF THE PRIOR ART

Folding bunk assemblies of the prior art have been generally inefficient with respect to the use of space, complicated in operation and expensive to manufacture and have oftentimes been subject to breakage of parts and malfunctions.

SUMMARY OF THE INVENTION

This invention was evolved with the general object of overcoming such and other disadvantages of prior constructions and of providing a simplified construction which provides ease of operation while obtaining maximum efficiency in the use of space. It is also an object to provide a construction which is economically manufacturable, rugged and durable.

In accordance with this invention, a folding bunk bed assembly is provided which is especially advantageous in campers, mobile homes and the like in which maximum efficiency in the use of space is of utmost importance. According to an important feature of the invention, cushion means are supported on a pair of arm means having ends arranged for pivotal connection to a wall for swinging movement about a horizontal axis close to the wall with vertical support means being provided for supporting the arm and cushion means in a position such that the cushion means are generally in a horizontal plane to serve as a bunk bed. In another position, the cushion means are swung downwardly to a position close to the wall so that efficient use of space is obtained when the cushion means are not in use as a bunk bed.

According to an important feature, the cushion means in the lowered condition serve as a back-rest for a person sitting on a seat-bed. The seat-bed serves as a lower bunk when the cushion means are elevated to the upper bunk bed condition, the seat-bed being then in vertical alignment therewith. With this feature, still more efficient use of space is obtained, a comfortable seat or sofa with a back-rest being provided for day time use and lower and upper bunk beds being provided for night time sleeping use.

Another important feature relates to the provision for movement of the cushion means relative to the arm means in a manner such that there is little or no space between the vertical wall and the adjacent edge of the cushion means while, at the same time, the cushion means is moved away from the axis of the arm means when moved to the seat condition to be at the proper position to serve as a back rest. With little or no space between the wall and the cushion means, the arrangement is safe and a person sleeping on the cushion means in the bunk condition cannot roll over and fall or become wedged between the cushion means and the wall or window.

According to a specific feature of the invention, the cushion means comprises first and second sections which are hingedly connected, the first section being positioned between the second section and the wall in the lowered condition and being positioned at the outside of the second section in the upper condition. This arrangement has important advantages. First, the bunk position can be at a reduced height for more ready access and to provide additional space between the cushion means and the ceiling in the bunk position. Secondly, the height of the cushioning means in the back-rest condition is reduced so as not to block windows in the wall structure. Third, the thickness in the back-rest condition is increased which provides for more comfortable seating while at the same time, the sofa-bed means may have a relatively large width for comfortable sleeping thereon.

Additional important features relate to the support of the hingedly connected cushion sections from the arm means. One feature is in the provision of means, preferably comprising a pair of links between each of the arm means and the section which is outermost in the lowered condition, for permitting movement of such section toward and away from axis of pivotal movement of the arm means, the section being close to the wall in the upper condition and downwardly, away from the axis, in the lowered condition. Another feature is in the provision of link means between the arm means and the section which is adjacent the wall in the lowered condition and which is positioned outwardly in the raised condition.

These and other objects, features and advantages of the invention will become more fully apparent from the following detailed description taken in conjunction with the accompanying drawings.

BRIEF DESCRIPTION OF THE DRAWINGS

FIG. 1 is a cross-sectional view through a portion of a camper or mobile home structure, showing in side elevation a folding bunk bed assembly according to the invention, the assembly being in a condition for use for seating;

FIG. 2 is a view similar to FIG. 1, but illustrating the assembly in a condition in which it provides a double bunk bed;

FIG. 3 is a front elevational view of folding structure of the assembly with cushion material removed, the condition of the structure corresponding to the condition shown in FIG. 1;

FIG. 4 is a sectional view taken substantially along line IV—IV of FIG. 3; and

FIG. 5 is a cross-sectional view similar to FIG. 4, but illustrating the condition of parts corresponding to the condition of FIG. 2.

DESCRIPTION OF A PREFERRED EMBODIMENT

Reference numeral 10 generally designates a folding bunk bed assembly constructed in accordance with the principles of this invention, shown installed in a camper or mobile home structure 11, including a ceiling 12, a floor 13 and a wall 14 having a window 15 therein. The assembly 10 includes cushion means 16, including two hindgedly connected sections 17 and 18, the cushioning means being supported from a pair of arms 19 and 20 having ends pivotally secured by pins 21 and 22 to brackets 23 and 24 secured to the wall 14, the arms 19 and 20 being pivotal about a common horizontal axis close to the wall 14.

In the condition shown in FIG. 1, the cushion means serves as a back-rest for a person or persons sitting on a seat-bed unit 25, supported by a frame structure 26 from the floor 13.

For bunk use, the assembly is operated to a condition as shown in FIG. 2 in which the arm means 19 are swung upwardly and in which the cushion section 17 is rotated relative to the section 18 to a position in which it projects outwardly from the section 18 with the upper surfaces of the sections 17 and 18 being substantially in a horizontal plane. Vertical support means in the form of straps 28 are provided, the upper ends of the straps being supported from the ceiling 12 and the lower ends thereof being connected to frame structure of the cushion section 17. The rearward portion of the seat-bed unit 25 is pivotally connected to the frame structure 26 by pins, one pin 29 being shown, and at the forward end, an element 30 is provided which may be pivoted from a position as shown in FIG. 1 in which the seat-bed unit 25 is pitched upwardly at a certain angle for seating and a position as shown in FIG. 2 in which the upper surface of the seat-bed unit is substantially in a horizontal plane, for sleeping.

FIG. 3 shows parts of the assembly with cushioning material removed. The section 18 includes a frame 32 which includes a longitudinal bar portion 34, a pair of end bar portions 35 and 36 and a pair of intermediate bar portions 37 and 38 in spaced parallel relation to the end bar portions 35 and 36, ends of the bar portions 37 and 38 being welded or otherwise secured to the longitudinal bar portion 34. Similarly, the section 17 includes a frame structure 40 which includes a longitudinal bar portion 42, a pair of end bar portions 43 and 44 and a pair of intermediate bar portions 45 and 46, parts of the bar portions 35-38 being shown broken away in FIG. 3 in order to show parts of the bar portions 43-46, positioned directly therebehind in the condition of the parts as shown in FIG. 3.

To hingedly connect the sections 17 and 18, a hinge 48 is provided including a part 49 welded or otherwise secured to the ends of the bar portions 35 and 37 and a part 50 welded or otherwise secured to the ends of the bar portions 43 and 45, with a hinge pin 51 extending through openings in the parts 49 and 50. A similar hinge 52 is provided at the opposite end, connecting the ends of the bar portions 36 and 38 with the ends of the bar portions 44 and 46.

The frame structure 32 for the section 18 is connected to the arm 19 through a pair of links 53 and 54, ends of the links 53 and 54 being pivotally connected to the bar portion 37 through a pair of pins 55 and 56 and opposite ends of the links 53 and 54 being connected to the arm 19 through a pair of pins 57 and 58. Similarly, the arm 20 is connected to the frame structure 32 through a pair of links 59 and 60 having ends pivotally secured to the bar portion 36 by pins 61 and 62 and having opposite ends secured to the arm 20 by pins 63 and 64. The axes of the pins 55-58 and 61-64 are parallel to each other and in transverse relation to the common axis of the pins 21 and 22 which support the arms 19 and 20. With this arrangement, the frame structure 32 for the section 18 can move toward and away from the pivot axis of the arms 19 and 20, it being noted that the section 18 is positioned a substantial distance away from the axis of the arms 19 and 20 in FIG. 1 while it is moved much closer to the axis of the arms 19 and 20 in the condition of FIG. 2.

A link 67 is provided between the arms 19 and the frame 40, one end of link 67 being pivotally connected to the arm 19 by a pin 68 and the other end of link 67 being pivotally connected to the bar portion 43 of frame 40 through a pin 69. Similarly, a link 70 is provided at the other end of the assembly, pivotally connected to the arm 20 through a pin 71 and pivotally connected to the bar portion 46 through a pin 72. The pins 68, 69 and 71, 72 are preferably so formed as to allow a slight degree of angular movement of the links 67 and 70 to accommodate the relative displacement of the end portions of the arms 19 and 20 discussed above.

The link 67 has a curved configuration and is formed with three notches 73, 74 and 75. In the condition as illustrated in FIGS. 2 and 5, notch 73 receives a pin 76 projecting from the arm 19, notch 74 receives a portion of the hinge 48 and notch 75 receives a pin 77 which projects from the bar portion 43 of the frame 40. As a result, when the assembly is in the condition as shown in FIGS. 2 and 5, upward or counter-clockwise movement of the section 17 and its frame structure 40 relative to the arms 19 and 20 is prevented and a strong support for the user is provided. The link 70, of course, has a configuration like that of the link 67, cooperating with pins 78 and 79 on the arm 20 and the bar portion 46 and with the hinge 52.

It is noted that in the illustrated arrangement, designed for a particular vehicle, the arm 19 is offset to clear the window 15. Also, it is noted that both arms 19 and 20 have a curved configuration such as to provide portions which lie quite close to the wall 14 in the condition shown in FIG. 1.

Although not essential, a pair of springs 81 and 82 may be provided, spring 81 extending between the links 53 and 54 in spring 82 extending between the links 59 and 60. Such springs aid in holding the cushion sections together in the condition of FIG. 1.

Although not illustrated, it will be understood that suitable flexible straps may be provided in the frame structures 32 and 40 for supporting cushioning materials and obtaining a firm but flexible support for the body of the user.

This invention thus provides an arrangement which provides a high degree of efficiency in the use of space, providing both a comfortable seat or sofa for seating and a double bunk for sleeping. The arrangement is quite simple in construction and operation and is economically manufacturable while being rugged and durable.

It will be understood that modifications and variations may be effected without departing from the spirit and scope of the novel concepts of this invention.

I claim as my invention:

1. In a folding bunk assembly for installation in an enclosure including a generally vertical wall, a floor and a ceiling, a pair of horizontally spaced arms means each arranged for connection at one end to the wall for pivotal movement about a common horizontal axis close to the wall, said pair of arm means being pivotal between first positions extending downwardly from said axis along the wall to second positions projecting generally horizontally outwardly from said wall, cushion means supported on said pair of arm means to be positioned close to the wall in said first position of said arm means and to project horizontally outwardly from the wall in said second position of said arm means to provide a bed, and vertical support means providing vertical support for said arm and cushion means in said second positions of said arm means, said cushion means including first and second cushion sections and a hinge connection between said first and second cushion sections for providing relative pivotal movement of said first and second cushion sections about a horizontal axis, said first cushion section being positionable between said second cushion section and the wall in said first positions of said arm means and being arranged to project outwardly from said second cushion section in said second positions of said arm means, said vertical support means being connectable to said first cushion section in said second positions of said arm means, and movement limiting means for limiting relative pivotal movement of said first and second cushion sections to maintain said first and second cushion sections in horizontal alignment in said second positions of said pair of arm means.

2. In an assembly as defined in claim 1, seat-bed means for support from the floor in spaced relation below and in vertical alignment with said cushion means when said pair of arm means are in said second positions thereof, said second cushion section serving as a backrest for a person sitting on said seat-bed means when said pair of arm means are in said second positions thereof.

3. In an assembly as defined in claim 1, connection means supporting said second cushion section from said arm means for movement toward and away from said common horizontal axis, said second section being movable between a position spaced a substantial distance from said common horizontal axis when said pair of arm means are in said first positions thereof and a position substantially closer to said common horizontal axis when said pair of arm means are in said second positions thereof.

4. In an assembly as defined in claim 3, said connection means comprising linkage means having pivotal connections to said arm means and to said second cushion section on pivot axes in spaced transverse relation to said common horizontal axis.

5. In an assembly as defined in claim 1, connection means supporting said second cushion section on said pair of arm means for pivotal movement with said pair of arm means about said common horizontal axis close to said wall.

6. In a folding bunk bed assembly for installation in an enclosure including a generally vertical wall, a floor and a ceiling, a pair of horizontally spaced arm means each arranged for connection at one end to the wall for pivotal movement about a common horizontal axis close to the wall, said pair of arm means being pivotal between first positions extending downwardly from said axis along the wall to second positions projecting generally horizontally outwardly from said wall, cushion means supported on said pair of arm means to be positioned close to the wall in said first position of said arm means and to project horizontally outwardly from the wall in said second position of said arm means to provide a bed, and vertical support means providing vertical support for said arm and cushion means in said second positions of said arm means, said cushion means including first and second cushion sections and a hinge connection between said first and second cushion sections for providing relative pivotal movement of said first and second cushion sections about a horizontal axis, said first cushion section being positionable between said second cushion section and the wall in said first positions of said second cushion in said second positions of said arm means, connection means supporting said second cushion section from said arm means for movement toward and away from said common horizontal axis, said second section being movable between a position spaced a substantial distance from said common horizontal axis when said pair of arm means are in said first positions thereof and a position substantially closer to said common horizontal axis when said pair of arm means are in said second positions thereof, second connection means between said pair of arm means and said first cushion section and so arranged as to operate through said hinge connection to move said second section from said position spaced a substantial distance from said common axis when said pair of arm means are in said first positions thereof to said position substantially closer to said common axis when said pair of arm means are in said second positions thereof.

7. In an assembly as defined in claim 6, said second connection means comprising a pair of link means pivotally connected on a horizontal axis to outer end portions of said arm means and pivotally connected to said first cushion section on a horizontal axis in spaced parallel relation to the axis of said hinge connection.

8. In an assembly as defined in claim 7, said vertical support means being connectable to said first cushion section in said second positions of said arm means, and movement limiting means including stop means engagable with said pair of link means to limit relative pivotal movement of said first and second sections and to maintain said first and second sections in horizontal alignment in said second positions of said arm means.

9. In an assembly as defined in claim 8, said connection means also supporting said second cushion section from said arm means for movement toward and away from said common horizontal axis, said second section being movable between a position spaced a substantial distance from said common horizontal axis when said pair of arm means are in said first positions thereof and a position substantially closer to said common horizontal axis when said pair of arm means are in said second positions thereof.

* * * * *